United States Patent
Hiatt et al.

(10) Patent No.: US 7,903,795 B2
(45) Date of Patent: Mar. 8, 2011

(54) SYSTEM AND METHOD FOR INDICATING STATUS OF AN INCOMING TRANSMISSION TO A USER

(75) Inventors: Cynthia Hiatt, San Jose, CA (US); Erik J. Johnson, Campbell, CA (US); Doree Duncan Seligmann, New York, NY (US); Ross Yakulis, Los Gatos, CA (US)

(73) Assignee: Avaya Inc., Basking Ridge, NJ (US)

( * ) Notice: Subject to any disclaimer, the term of this patent is extended or adjusted under 35 U.S.C. 154(b) by 1709 days.

(21) Appl. No.: 10/868,620

(22) Filed: Jun. 15, 2004

(65) Prior Publication Data

US 2005/0275878 A1    Dec. 15, 2005

(51) Int. Cl.
*H04M 1/64* (2006.01)

(52) U.S. Cl. ............ 379/88.12; 379/88.13; 379/93.02; 379/211.04; 379/229; 379/413.04; 358/1.15; 704/270.1

(58) Field of Classification Search .............. 379/88.12, 379/211.1, 88.15, 211.02, 88.22, 215.01, 379/265.02, 88.25, 88.13, 93.02, 211.04, 379/229, 413.04; 709/206, 204, 207, 200, 709/202, 318; 340/825.27; 365/225.7; 381/80; 455/412, 412.1, 414.1, 466, 412.2, 414, 435.1; 702/62; 370/351; 345/752; 705/1; 715/752; 358/1.15; 704/270.1
See application file for complete search history.

(56) References Cited

U.S. PATENT DOCUMENTS

| | | | | |
|---|---|---|---|---|
| 5,398,021 A | * | 3/1995 | Moore | 340/825.27 |
| 5,692,039 A | * | 11/1997 | Brankley et al. | 379/229 |
| 5,802,160 A | * | 9/1998 | Kugell et al. | 379/211.04 |
| 5,903,643 A | * | 5/1999 | Bruhnke | 379/413.04 |
| 6,002,779 A | * | 12/1999 | Johnston | 381/80 |
| 6,236,716 B1 | * | 5/2001 | Marcus et al. | 379/88.15 |
| 6,253,075 B1 | | 6/2001 | Beghtol et al. | |
| 6,260,148 B1 | | 7/2001 | Aggarwal et al. | |
| 6,415,318 B1 | | 7/2002 | Aggarwal et al. | |
| 6,549,937 B1 | | 4/2003 | Auerbach et al. | |
| 6,604,133 B2 | | 8/2003 | Aggarwal et al. | |
| 6,631,405 B1 | | 10/2003 | Kobata | |
| 6,631,412 B1 | | 10/2003 | Glasser et al. | |

(Continued)

OTHER PUBLICATIONS

U.S. Appl. No. 10/672,633, filed Sep. 26, 2003, entitled "Method and Apparatus for Delivering a Voice Mail Message With an Indication of the Presence of the Sender."

(Continued)

*Primary Examiner* — Gerald Gauthier
(74) *Attorney, Agent, or Firm* — Joseph B. Ryan; Jason Paul DeMont; Wayne S. Breyer

(57) ABSTRACT

A method and system are provided for managing incoming transmissions. A response to an incoming transmission is generated as a function of recipient availability and information relating to the incoming transmission, such as a medium of the transmission. An indication, representative of the incoming transmission and the response, is provided to one or more recipient devices. A method and system are also provided for managing one or more transmission events, represented by notification signals, where the notification signals are processed as a function of schedule data relating to a user. Indication data is generated as a function of the notification signals and provided to one or more user-specified devices, wherein the indication data includes an identification of a type of transmission event and a representation of a response to at least one of the transmission events.

31 Claims, 5 Drawing Sheets

U.S. PATENT DOCUMENTS

| | | |
|---|---|---|
| 6,697,810 B2 | 2/2004 | Kumar et al. |
| 6,714,967 B1 | 3/2004 | Horvitz |
| 6,724,870 B1 * | 4/2004 | Henderson et al. ........ 379/93.02 |
| 6,782,414 B1 * | 8/2004 | Xue et al. .................... 709/206 |
| 6,785,379 B1 * | 8/2004 | Rogers et al. ........... 379/265.02 |
| 6,879,677 B2 * | 4/2005 | Trandal et al. ........... 379/215.01 |
| 6,944,083 B2 * | 9/2005 | Pedlow, Jr. ................. 365/225.7 |
| 6,999,565 B1 * | 2/2006 | Delaney et al. ............ 379/88.13 |
| 6,999,566 B1 * | 2/2006 | Eason et al. ............... 379/88.22 |
| 7,133,506 B1 * | 11/2006 | Smith ........................ 379/88.25 |
| 7,139,554 B2 * | 11/2006 | Litwin, Jr. .................. 455/412.2 |
| 7,139,797 B1 * | 11/2006 | Yoakum et al. ............... 709/204 |
| 7,167,546 B2 * | 1/2007 | Moore ....................... 379/88.12 |
| 7,216,043 B2 * | 5/2007 | Ransom et al. ................. 702/62 |
| 7,363,345 B2 * | 4/2008 | Austin-Lane et al. ........ 709/207 |
| 7,472,068 B2 * | 12/2008 | Koch ......................... 704/270.1 |
| 7,559,030 B2 * | 7/2009 | Ryu ............................... 715/752 |
| 2002/0142756 A1 * | 10/2002 | Rutledge et al. .............. 455/412 |
| 2002/0160757 A1 * | 10/2002 | Shavit et al. .................. 455/414 |
| 2002/0165729 A1 * | 11/2002 | Kuebert et al. ................... 705/1 |
| 2003/0018704 A1 * | 1/2003 | Polychronidis et al. ...... 709/202 |
| 2003/0052915 A1 * | 3/2003 | Brown et al. ................. 345/752 |
| 2003/0131143 A1 * | 7/2003 | Myers .......................... 709/318 |
| 2003/0236086 A1 * | 12/2003 | Litwin, Jr. .................. 455/412.1 |
| 2004/0010808 A1 * | 1/2004 | deCarmo ...................... 725/139 |
| 2004/0019645 A1 * | 1/2004 | Goodman et al. ............ 709/206 |
| 2004/0078440 A1 * | 4/2004 | Potter et al. ................... 709/206 |
| 2004/0176076 A1 * | 9/2004 | Uppuluri .................... 455/414.1 |
| 2004/0203766 A1 * | 10/2004 | Jenniges et al. ............ 455/435.1 |
| 2004/0236836 A1 * | 11/2004 | Appelman et al. ............ 709/206 |
| 2005/0041793 A1 * | 2/2005 | Fulton et al. .............. 379/211.01 |
| 2005/0047562 A1 * | 3/2005 | Holz et al. .................. 379/88.22 |
| 2005/0083904 A1 * | 4/2005 | Khartabil et al. .............. 370/351 |
| 2005/0141691 A1 * | 6/2005 | Wengrovitz .............. 379/211.02 |
| 2005/0198096 A1 * | 9/2005 | Shaffer et al. ................. 709/200 |
| 2005/0239483 A1 * | 10/2005 | Suoste .......................... 455/466 |
| 2005/0251555 A1 * | 11/2005 | Little ........................... 709/206 |
| 2007/0299927 A1 * | 12/2007 | Knauerhase ................. 709/206 |

OTHER PUBLICATIONS

U.S. Appl. No. 10/672,635, filed Sep. 26, 2003, entitled "Programmable Presence Proxy for Determining a Presence Status of a User."

* cited by examiner

| USER NAME ⎡302 | PRESENCE STATUS ⎡304 | AVAILABLE DEVICES ⎡306 | DEVICE ADDRESS ⎡308 | OP STATE ⎡310 |
|---|---|---|---|---|
| ⋮ | ⋮ | ⋮ | ⋮ | ⋮ |
| JOHN SMITH | BUSY | TELEPHONE | 203-555-1212 | ON |
| | AVAILABLE | EMAIL | jsmith@server.com | ON |
| | AVAILABLE | FACSIMILE | 203-123-4567 | ON |
| ⋮ | ⋮ | ⋮ | ⋮ | ⋮ |

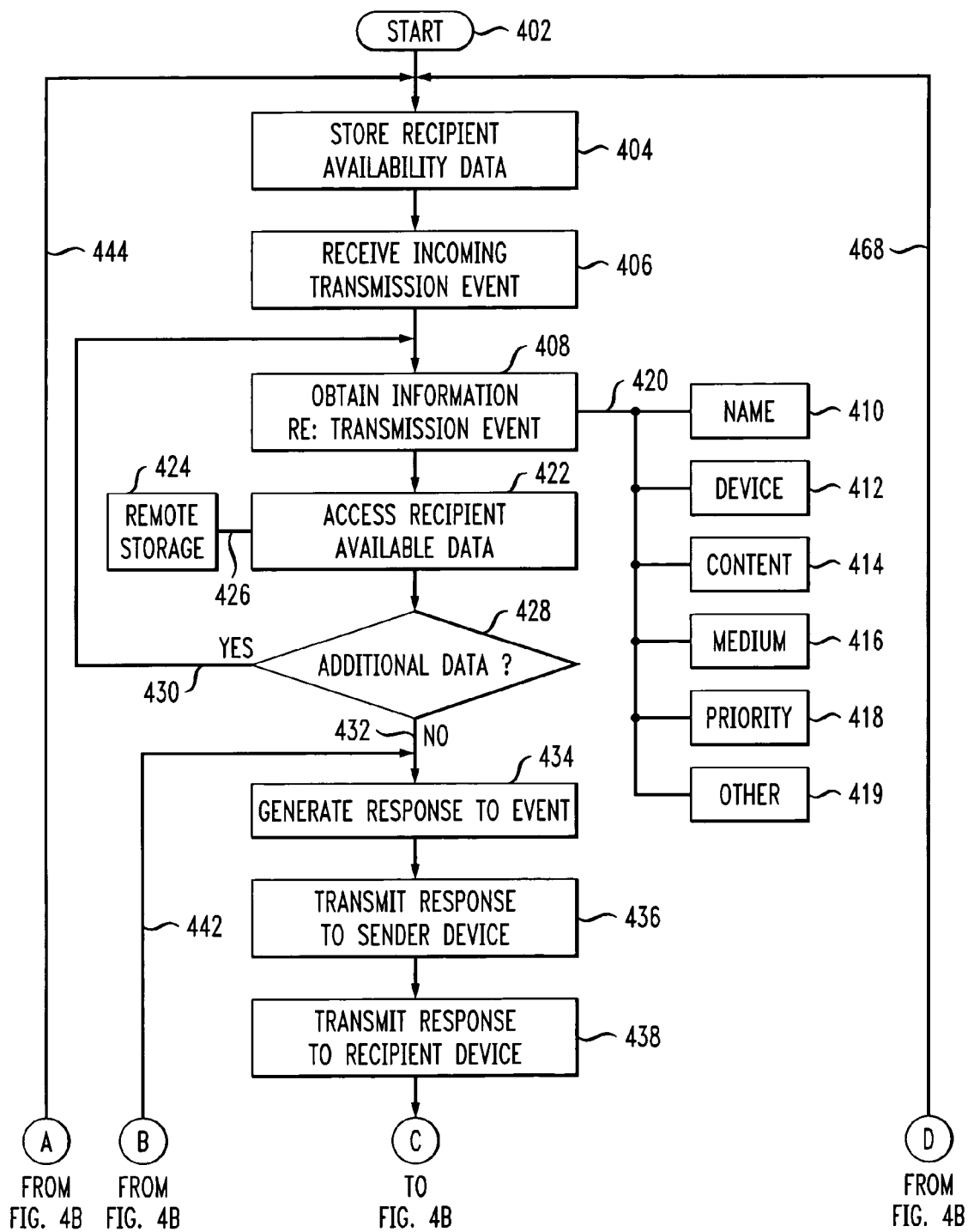

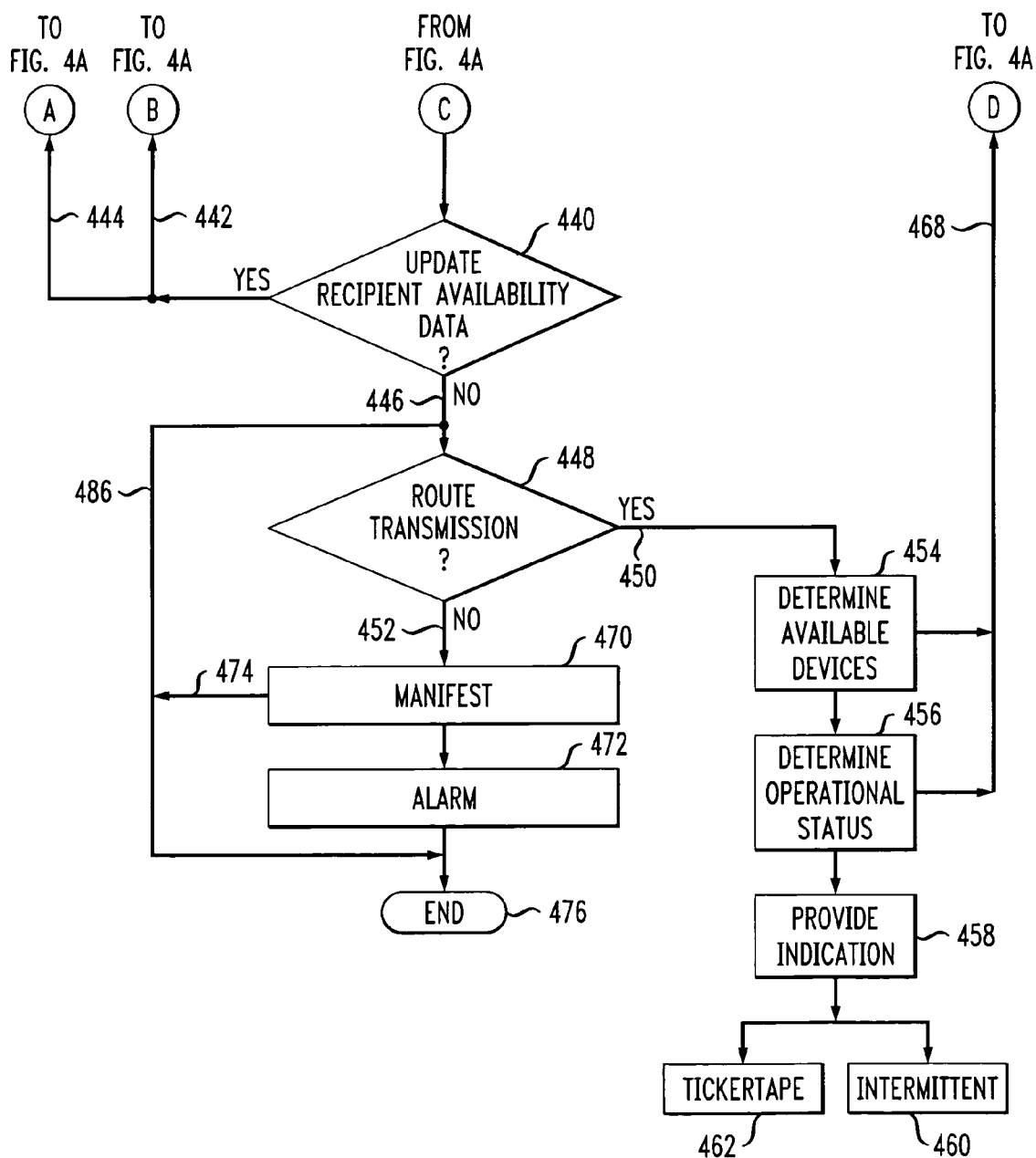

| TIME (502) | DATE (504) | MESSAGE (506) |
|---|---|---|
| 11:56 | 10/17/04 | YOU ARE RECEIVING A CALL FROM 408-355-1212 |
| 11:56 | 10/17/04 | THIS CALL IS FROM JOHN SMITH |
| 11:56 | 10/17/04 | YOUR AGENT HAS RESPONDED THAT YOU ARE UNAVAILABLE UNTIL 1:00 |
| 11:57 | 10/17/04 | YOU ARE RECEIVING AN EMAIL FROM jdoe@servername.com |
| 11:57 | 10/17/04 | THIS EMAIL IS FROM JANE DOE |
| 11:57 | 10/17/04 | YOUR AGENT HAS RESPONDED THAT YOU WILL REPLY AFTER 1:00 |

SYSTEM AND METHOD FOR INDICATING STATUS OF AN INCOMING TRANSMISSION TO A USER

FIELD OF THE INVENTION

The present invention relates generally to techniques for providing an indication of an incoming transmission to a message recipient and, more particularly, to techniques for providing an indication to the message recipient regarding how each incoming transmission was handled.

BACKGROUND OF THE INVENTION

A number of techniques exist for filtering communications in a telephone network. Caller ID features, for example, identify a caller and allows a called party to decide whether to answer a given incoming telephone call based on the identity of the caller. Some telephone service providers also offer services to screen incoming calls automatically based on "do not disturb lists" so a user is not disturbed by telephone calls from unwanted parties.

U.S. Pat. No. 6,253,075, issued to Beghtol et al., entitled, "Method and Apparatus for Incoming Call Rejection," discloses a system that rejects incoming calls for a mobile communications device. A rejection memory within the mobile device is preprogrammed with identification information representative of transmitting stations to be rejected. When a call is received, identification information included with the incoming call is compared with identification information contained in the rejection memory. When a match is detected, a rejection message is automatically sent by the mobile communications device to the transmitting station. Additionally, upon display of the identification information of an incoming call, the user may manually trigger the transmission of the rejection message from the mobile communications device.

Techniques also exist for filtering transmissions sent over the Internet. For example, U.S. Pat. No. 6,631,405, issued to Kobata, entitled, "Smart Internet Information Delivery System Which Automatically Detects and Schedules Data Transmission Based on Status of Client's CPU," relates to a smart delivery system for transmitting video, audio, hyper-text and web documents to end users via the Internet on a non-real-time discontinuous basis. The server providing the information periodically ascertains whether the end user terminal is busy. If so, the transmission to the end user is terminated and the information is stored until such time as the "busy" indication is terminated. The indication for the end user of incoming information is in the form of an icon generated on-screen that the user can click to obtain the sought-after information.

Thus, telephone and Internet transmissions can be filtered using automated agents, and it would be an advancement in the state of the art to be able to more efficiently monitor the filtering performed by automated agents and to provide feedback to a user of the status of incoming transmissions.

SUMMARY OF THE INVENTION

Generally, a method and system are disclosed for managing incoming transmissions. A response to an incoming transmission is generated as a function of recipient availability and information relating to the incoming transmission, such as a medium of the transmission. An indication, representative of the incoming transmission and the response, is provided to one or more recipient devices.

A method and system are also provided for managing one or more transmission events, represented by notification signals, where the notification signals are processed as a function of schedule data relating to a user. Indication data is generated as a function of the notification signals and provided to one or more user-specified devices, wherein the indication data includes an identification of a type of transmission event and a representation of a response to at least one of the transmission events. In this manner, the present invention reveals the results of filtering incoming transmissions and enables a user to modify filtering parameters and/or respond to a received transmission.

A more complete understanding of the present invention, as well as further features and advantages of the present invention, will be obtained by reference to the following detailed description and drawings.

BRIEF DESCRIPTION OF THE DRAWINGS

FIG. 3 illustrates exemplary recipient availability data used in conjunction with the present invention;

FIGS. 4A and 4B shows an algorithm used to generate a response to an incoming transmission; and FIG. 5 illustrates an exemplary display according to the present invention.

DETAILED DESCRIPTION

The present invention provides a user, also referred to herein as a recipient, visibility to the operations of a communications device, such as an automated agent, which may be in communication with a plurality of other network devices, such as telephone, facsimile machine, and PC (personal computer) devices.

The present invention also provides real time notification of communication events, such as incoming transmissions, and communication streams thereby allowing the user to observe the automated agent in action. This provides feedback to the user and also enables the user to monitor and tailor the automated agent to the desired behavior. Furthermore, if the user is away from his/her desk, or workstation, the user can check a log file to view the actions that were taken by the automated agent.

Figure 1:
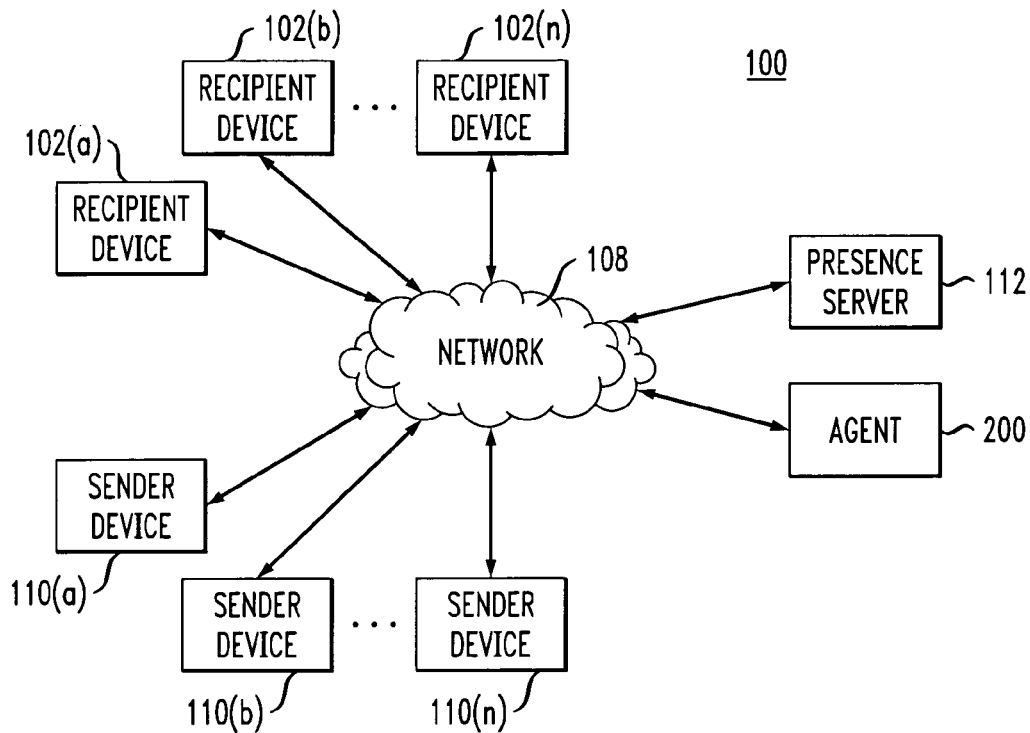
FIG. 1 illustrates a network environment in which the present invention can operate.

FIG. 1 illustrates a network environment 100 in which the present invention can operate. Recipient devices 102(a) through (n) (where n is any suitable number), generally referred to herein as recipient devices 102, are coupled to network 108, via associated interconnectors, which are typically a wired or wireless connection, or combination thereof, capable of providing bi-directional communication (data communications, voice communications, text-to-speech, video data, instant messages, e-mails and audio data). Sender devices 110(a) through (n) (where n is any suitable number), generally referred to herein as sender devices 110, agent 200 and server 112 are also coupled to network 108 via associated network interconnectors. Network 108 is a network of interconnected terminals or devices. The network may be, for example, a LAN (local area network), a WAN (wide area network), Internet, PSTN (public switched telephone network), WLAN (wireless local area network), PBX (private branch exchange) switches or combinations thereof, or other interconnection of processing or communication devices.

Recipient devices 102 are capable of receiving transmission events and sender devices 110 are capable of transmitting transmission events. Transmission events include, for example, voice data, email data, instant messages (IM), facsimiles, scanned data, photographic data, audio streams and video data. Recipient devices 102 and sender devices 110 may include, for example, telephones, computers, hand-held devices, facsimile machines, scanners, printers, cell phones, personal digital assistants (PDA), wireless email clients, mobile devices using SMS (short message system) or a similar transport mechanism, multiprocessor systems, microprocessor-based or programmable consumer electronic devices, network PC's, minicomputers, mainframe computers, and other devices with processing and output capabilities.

Recipient devices 102 are used to present notifications of incoming transmissions and a response that was provided to a sender. A recipient may use one or more of devices 102 to establish availability data or modify availability data. Also, the availability data may be obtained implicitly, for example, by monitoring a recipient's telephone line status, computer log-on status, email activity, electronic calendar entries, office lights and other passive activity indications. Further examples of passive activity indicators data are disclosed in U.S. application Ser. No. 10/672,633, "Method and Apparatus for Delivering a Voice Mail Message with an Indication of the Presence of the Sender," filed Sep. 26, 2003, which is hereby incorporated by reference in its entirety herein.

Figure 2:
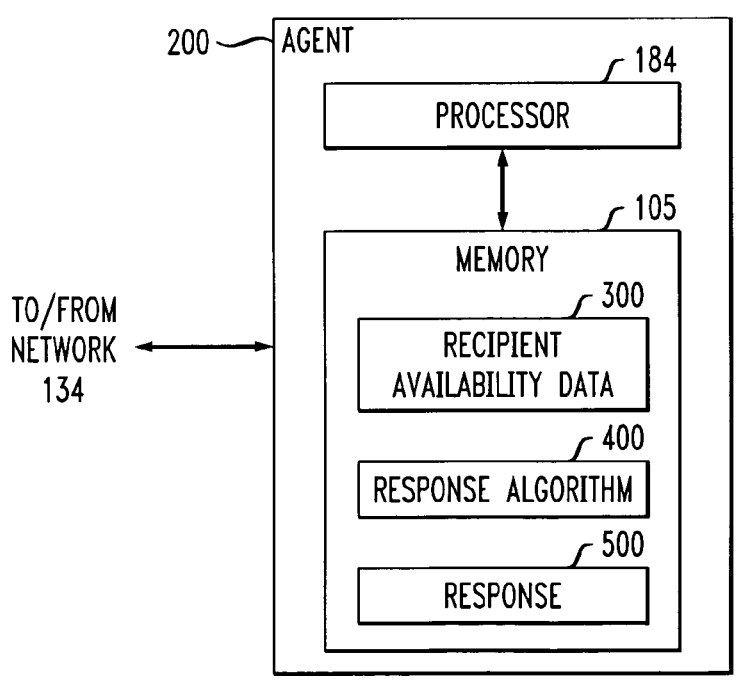
FIG. 2 shows a more detailed view of the agent shown in FIG. 1.

Agent 200, discussed further below in conjunction with FIG. 2, is coupled to network 108 and is in bi-directional communication with recipient devices 102, server 112 and sender devices 110. Agent 200 may include, for example, automated agents, communication agents, personal communications managers, and personal agents adapted to perform complex processing and/or data manipulations with respect to managing communication streams, also referred to herein as transmission events. Examples of agent 200 are described in U.S. application Ser. No. 10/672,635, "Programmable Presence Proxy for Determining a Presence Status of a User," filed Sep. 26, 2003, which is hereby incorporated by reference in its entirety herein. The agent 200 may also use the recipient availability data as well as sophisticated presence information, such as calendar and schedule information, rules and settings, passive monitoring, such as monitoring keyboard activity, log-on status or office lights, as described previously, to route and filter these communication streams.

Agent 200 receives incoming transmissions from sender devices 110 or network 108. An incoming transmission can cause a transmission event and the agent 200 can access availability information for a recipient (including information specific to a recipient's availability at particular recipient devices) as well as obtain information related to the incoming transmission event.

Server 112, which is coupled to network 108, is typically a computer that may include a processor and memory. The processor and memory provide processing capabilities and nonvolatile storage of computer-executable instructions, data structures, program modules and other data for the server 112.

A number of program modules may be stored on the server 112, including an operating system, application programs and other program modules.

Although only one agent 200 is shown in FIG. 1, one or more additional agents could be used to perform a portion of the processing described in relation to agent 200. For example, a first agent could be used to receive the transmission event, access the recipient availability data and generate a response and a second agent could be used to provide the response to selected sender and recipient devices, 110 and 102, respectively.

FIG. 2 shows a more detailed view of the agent 200 shown in FIG. 1. As seen in FIG. 2, agent 200 includes a processor 184, an interconnector 134 and a memory 105, which includes storage modules 300, 400 and 500.

Storage module 300, discussed below in conjunction with FIG. 3, is adapted to store recipient availability data, as described herein.

Storage module 400, discussed below in conjunction with FIG. 4. is adapted to store a response algorithm, which is used to generate a response, or recipient availability indication. This indication is generated by processing available data relating to the recipient and the transmission.

Storage module 500, discussed below in conjunction with FIG. 5, is adapted to store a response to a transmission event.

Processor 184, which is coupled to memory 105, is adapted to retrieve data from remote and local locations and use the data stored in the modules of memory 105 (e.g., 300, 400 and 500) to perform the necessary data manipulations.

Thus, as discussed previously, the agent 200 utilizes the recipient availability data and information about the transmission event to generate a response to the transmission event. The generation process may also include pre-defined parameters, user preferences, algorithms, or other criteria, impacting how communications will be handled and provides a user with the ability to suspend, intervene, modify or otherwise alter the rules and alter how the communications will be handled. The response generated by the agent 104 may be provided to one or more selected sender devices (shown as element 110 in FIG. 1) and one or more selected recipient devices (shown as element 102 in FIG. 1). The agent 200 can also provide indications of network activity to the recipient devices.

Additionally, agent 200 also communicates with the server (shown as element 112 in FIG. 1) and can access data from the server and store data to the server. The agent 200 may operate from a remote or local server computer that evaluates rules established by the user and conditionally routes communication streams, or transmission events. The rules for handling transmission events can be any combination of operations, routing or responses, examples include, assigning a caller a priority ranking, ascertaining content of a telephone call or data transmission, schedule data, (which includes accessing user presence information, determining a time of day component) or other parameter that discriminates how a transmission should be handled. As the agent 200 performs the management tasks, it sends status information to the user detailing the type of transmission event, who is initiating the transmission event and the action the agent has taken with it. The agent 200 provides status information to the recipient device, or other output facility specified by the user. The information may also be accumulated in a log file, or manifest, which allows the user to keep a record of the transmission events and the resulting actions taken. The manifest enables the user to validate that the agent is operating properly and allows the user to further customize any filtering to the user's needs.

Alternatively, instead of providing the actual transmission event to the recipient device and the actual response sent to the sender device, the agent 200 can provide a representation of the event and the response to one or more reception devices. For example, when the agent determines that a telephone call is an undesired telemarketer, the agent 200 will merely hang up on the caller and provide a record of the event (hanging-up) to one or more recipient devices.

FIG. 3 illustrates an example of recipient availability data 300 used in conjunction with the present invention. The recipient availability data 300 represents information for each user of the system and may include data from a plurality of sources. For example, the recipient availability information may be gathered from user input, presence sensing, calendar information, pre-established criteria, scheduled meetings, holidays, vacation time and other time that is deemed either unavailable or when the recipient is deemed unable to receive a particular type of transmission.

The availability data is accumulated and stored and may be accessed when a transmission event occurs so that the agent can generate a response to the transmission event based on the user availability or presence. The data can be transmitted to, and accessed by, a remote workstation or recipient device, as described herein.

In FIG. 3, field 302 indicates a data field for a user name, field 304 indicates a data field for presence status for each user, field 306 indicates a data field for available devices the user can access, field 308 is a data field for an address of each available device and field 310 shows a data field for an operational status of each device.

Field 302 stores user names for a plurality of users. Specifically, one example is that a user, identified as "John Smith" who has a presence status indicator associated with various devices. In the example shown, one telephone line with device address (telephone number) 203-555-1212 is busy, which is stored in field 304. The telephone line is "on" or operational so field 310 provides an "on" indication. An email with URL (uniform resources locator) (jsmith@server.com) is an available device for the user so the presence status field 304 indicates that the email address is available. The user is logged onto the email account so field 310 indicates that the operational status is "on." If the user were not logged into the email account, the operational status would indicate "off." Therefore, when the email is "off," an instant message IM sender would receive a response that the user is not logged into the email account so an instant reply from the user is not likely. A facsimile device (field 306) is also an available device for the user, as indicated by status indicator "available" of field 304. The device has an address (203-123-4567) and the device is "on" as indicated by the operational status in field 310.

The user may modify or update the recipient availability data to reflect changes in his/her schedule. Furthermore, modifications to an electronic calendar or spreadsheet may be used to modify the availability data.

FIGS. 4A and 4B show a flowchart 400 of steps for a response algorithm. These steps, or functional features, are shown as blocks and are suitably stored on a computer-readable medium, which can be read by a computer, or other processing device as described herein. For example, the steps of flowchart 400 may be stored in the server (shown as element 112 in FIG. 1) or the memory (shown as element 105 in FIG. 2). The steps of flowchart 400 may be used to generate program code or perform a series of data manipulations. While FIGS. 4A and 4B show steps in a particular sequence, this is for explanation purposes, and it is within the scope of the invention that the specific sequence may be modified as a function of specific applications, program code and design considerations.

Step 402 shows that the processing begins. Step 404 stores recipient availability data. This data represents the presence and activity status of a user, which may include whether the recipient is scheduled to attend a meeting, conference call, out of the office, vacation time, sick leave or other activity. The recipient availability data may be stored in a remote memory, local memory, removable memory or any computer-readable medium.

Step 406 sends an incoming transmission event to a recipient. This transmission event is typically received by an automated agent and may be a telephone call, facsimile, email, IM or other communication or attempted communication. The transmission event is dealt with even though the actual communication may not reach the user. For example, a wrong number, or unwanted phone call or spam may never reach the user, since the agent may terminate the communication prior to reception. Step 408 obtains information about the transmission event. This information is typically any data relating to the transmission and specific examples are shown in steps 410-419, which are reached via line 420. Specifically, step 410 obtains a name of a sender; step 412 obtains a type of transmission device that is generating the transmission event (i.e., telephone, computer, fax); step 414 obtains content of the transmission; step 416 obtains a medium of the transmission (voice, text, video); and step 418 obtains priority a status indicator, if provided. The priority status indicator may be a special access code or other information provided by a transmission device or sender that gives the transmission a heighten level of access. Step 419 obtains other information relating to the transmission. The information obtained may be automatically supplied (e.g., ANI (automatic number identification)) or may be obtained by the agent, such as examining the content, seeking a priority indicator, establishing whether the area code is significant or any other relevant information.

Step 422 accesses the recipient availability data and step 424 accesses the recipient availability data from a remote storage location.

Step 428 determines whether additional data is needed from the transmission event. If so, "yes" line 430 leads to step 408 that obtains additional data. If not, "no" line 432 leads to step 434 that generates a response to the incoming transmission event. This response may be in voice or data format and may include, for example: an instruction for the sender to resend the transmission to a different reception device; a message from the recipient; a request for the sender to send a transmission in a different medium (i.e., send an email rather than telephone call); an interactive voice response; an automated response; a response to a different sender device; a return facsimile message; or an indication of when the recipient will be available to reply. This response is generated as a function of the recipient availability data and the transmission data. The transmission data, or parameters, includes the information about the transmission that was obtained in step 408, described above.

Step 436 transmits the response to one or more sender devices. The particular sender devices that receive the response may be a function of the sender device that generated the transmission event or a device indicated in the information obtained by the agent in step 408, or a device selected by the agent. The response typically indicates the availability status of the recipient for that particular transmission event or how the transmission was handled.

Step 438 transmits an indication of the response that was sent to one or more sender devices to one or more recipient-specified devices. The indication may be the actual response or may be a summary of activity or a part of the response. The indication may be a text representation, audible alert, icon, LED (light emitting diode), text-to-speech, video, hyperlink, IM or other visual or audible signal. The indication may also indicate the actual transmission event as well as the response. The recipient can designate reception devices at which they wish to receive the transmission events and the indication of responses. A recipient can also update available devices that they would like to receive transmissions. For example, if a recipient has two devices operating and receives a transmission notification, the recipient can turn on a third device and that device is an available reception device.

Step 440 determines whether the recipient would like to update the availability data. The recipient may wish to update availability information based on events that transpire or schedule conflicts. For example, if a recipient receives an urgent phone call, she may wish to indicate to the caller that she will take that call, even though the agent has deemed the recipient to be unavailable by phone. The recipient can modify the data "on-the-fly" or substantially real-time, so that the sender receives a response that the recipient will take the call. As stated above, if the recipient turns "on" an additional device, that device will be an available device to receive transmissions. Line 442 shows that a recipient can update the recipient availability status for a transmission event, as it is being received. For example, the response to the sender can be updated to inform the sender that the recipient will take the call, or some other modification to the response has occurred. Furthermore, line 444 leads to step 404, which modifies the recipient availability data to reflect the modification, for example, when the recipient takes a phone call, the recipient availability data will be updated to reflect that the recipient is on the telephone. This updated recipient availability data will impact how subsequent transmission events are handled.

Thus, the response algorithm enables the sender to receive a modified response from the agent and the agent updates the availability data to reflect the recent development (i.e., the urgent telephone call.)

If the recipient does not wish to update the availability data, line 486 from step 440 shows that end step 476 can be reached.

Alternatively, "no" line 446 leads to decision step 448 that determines whether the transmission and/or response should be routed to another reception device. If so, "yes" line 450 leads to step 454 that determines available recipient devices. This includes determining devices that are associated with a particular recipient. For example, some recipients may have email access, telephone access and facsimile access; other recipients may only have cell phone access. Step 456 establishes an operational status, such as "on" or "off," to determine possible destinations for the indication and/or the transmission event. For example, if a recipient does not have their cell phone on, the operational status of that device will be "off." Line 468, which includes the output from steps 454 and 456, leads to step 404 that provides the available reception device data and operational state of reception devices to be stored with the recipient availability data. Step 458 provides any combination of the transmission event, notification of the event and a response to the event to one or more reception devices of the recipient, such as an email account, facsimile machine, voicemail or other reception device. This information can indicate which reception device(s) received the transmission event and any routing of the event.

Step 460 displays activity data (i.e., notification of transmission events and the responses provided to the sender device(s)) to one or more reception devices intermittently, for example, at pre-selected time intervals. Step 462 displays the activity to one or more reception devices continuously, as a "tickertape" display.

Line 452, which comes from decision step 448, leads to step 470, which generates a manifest of plural transmission events and the responses provided. Line 474 shows that upon completion of the manifest, end step 476 is reached.

Alternatively, step 472 generates an alarm condition if a transmission event satisfies pre-determined criteria. The alarm can be provided to the recipient in the same form as the indication or a special alert icon, text or graphic. Once the alarm has been generated and output, end step 476 is reached.

FIG. 5 shows an exemplary display 500 according to an embodiment of the present invention. Display 500 includes a time field 502, a date field 504 and a message field 506. These data fields and the content of the fields are typically displayed as a display or output.

As shown by FIG. 5, an incoming transmission is sent at 11:56 on October 17 and is a telephone call from 408-355-1212, additional information related to the transmission can be provided to the recipient, as shown by the identification of the calling party as "John Smith." As shown in field 506, an indication of the response is provided to the recipient. As discussed above, the recipient can modify availability based on the incoming transmission. For example, if the recipient wanted to take the call from John Smith, the recipient could answer the call and update the availability data to reflect that the recipient is on the telephone and to direct other telephone calls to voicemail or other destination.

As shown in FIG. 5, the recipient is receiving an email from an identified source, and message field 506 provides additional information, specifically the sender's name. The email transmission event has been responded to and the recipient has visibility to the time, date and content of the response.

While FIG. 5 shows a textual description of both the transmission event and the response, it is also an embodiment of the invention that the incoming transmission event and/or response can also be indicated as an audible signal, icon, voice-to-text, text-to-speech, video, instant message, visual signaling or alert signal, indicating an attempt to contact the recipient.

While FIG. 5 shows a manifest display in which a series of transmissions and responses are displayed, it is also an embodiment of the invention that the information could be displayed as a "tickertape" in a frame, footer, banner or tool bar on a computer monitor or other output device. This provides a continuously updated commentary to which the user can respond.

An example of this tickertape running commentary is a recipient, who is on the telephone, receives a call (incoming transmission) from a caller who is identified as a low priority caller and the content of the call is unknown. The incoming call could be indicated on the recipient's computer, and a response to the caller could be a suggestion that they call back at a later time. The recipient, upon notification of this response may suspend or hang-up with the current caller to take the new call. This response would cause the system to provide the new caller with a message to hold on since the recipient will take their call.

Another example of the tickertape embodiment is that a sender wishes to send a document to a recipient but the sender indicates that an email is being sent because the sender knows that the recipient does not have a display or a printer with him. The recipient receives the document and responds by telling the sender to wait while the recipient goes to a workstation, registers there and the sender can then send the document to that workstation.

It is also an embodiment of the present invention that the recipient can receive data relating to how other devices are responding to incoming transmissions. For example, a recipient using a computer can receive an indication on the computer display that a fax has been received on their fax machine.

It is another embodiment that the status data of an available recipient device could include a selection of recipient devices as a function of a person's location. This data could also include an indication that the recipient is able to receive transmission notifications and/or actual transmissions at another person's device.

It is yet another embodiment that two agents could be used to manage one or more transmission events. For example, a first agent could be used to receive notification signals of transmission events. The first agent could access the availability data and process the notification signals. A second agent could be used to provide, to one or more user-specified devices, indication data for the processed notification signals, and the indication data may include an identification of a type of transmission event and a representation of a response to the transmission event.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, or may be devices adapted to provide output by "reading" to the user using text-to-speech technology, or may be devices that retrieve a stored message from memory or database and the like. Embodiments of the invention may also be practiced in distributed computing environments where tasks are performed by local and remote processing devices that are linked through a communications network. In a distributed computing environment, program modules may be located in both local and remote memory storage devices.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that these and other embodiments and variations shown and described in the examples set forth above and the figures herein are merely illustrative of the principles of this invention and that various modifications may be implemented by those skilled in the art without departing from the scope and spirit of the invention.

We claim:

1. A method comprising:
   receiving by an agent device:
   i) a first indicium that indicates the availability of a recipient, and
   ii) a transmission from a sender that is addressed to the recipient;
   transmitting by the agent device to the recipient a second indicium that comprises information about:
   i) the first indicium, and
   ii) the transmission, wherein the second indicium is distinct from the transmission; and
   transmitting by the agent device to the sender a response based on:
   i) the first indicium,
   ii) a parameter that the agent device previously received from the recipient; and
   iii) information about the transmission.

2. The method of claim 1 further comprising:
   transmitting by the agent device to the recipient a third indicium that comprises information about the response to the sender.

3. The method of claim 1 wherein the availability of the recipient depends on the parameter.

4. The method of claim 1 further comprising routing the transmission to the recipient.

5. The method of claim 4 wherein the routing is based on at least part of the content of the transmission.

6. The method of claim 1 further comprising transmitting the second indicium to the recipient for a specified period of time.

7. The method of claim 1 further comprising transmitting the second indicium to the recipient continuously.

8. The method of claim 1 wherein the second indicium comprises: text data, graphic data, text-to-speech, video, instant message, light signal, and audible signal.

9. The method of claim 1 wherein the response comprises an automated component.

10. The method of claim 1 wherein the availability of the recipient depends on the medium of the transmission that is addressed to the recipient.

11. The method of claim 1 further comprising transmitting to the recipient information about the availability of a reception device that is associated with the recipient to receive the transmission.

12. The method of claim 1 further comprising transmitting to the recipient information about an operational state of a reception device that is associated with the recipient.

13. The method of claim 1, wherein the recipient availability utilizes a remote designation indication.

14. A method comprising:
    receiving by an agent device:
    i) a notification signal that represents a transmission event that is addressed to a user, and
    ii) data about the schedule of the user;
    generating by the agent device a response to the transmission event based on the schedule of the user; and
    transmitting an indication to the user, wherein the indication comprises:
    i) an identification of the type of the transmission event, and ii) a representation of the response to the transmission event.

15. The method of claim 14, wherein the generating step is performed in response to the transmission event.

16. The method of claim 14, wherein the response includes an automated component.

17. The method of claim 14, wherein the indication comprises: text data, graphic data and an audible signal.

18. The method of claim 14, further comprising updating the data about the schedule of the user.

19. The method of claim 14, wherein transmitting the indication to the user is performed as a function of the type of the transmission event.

20. The method of claim 14, wherein the indication to the user is transmitted continuously.

21. The method of claim 14 further comprising:
accumulating a plurality of indications for a user;
generating a manifest that comprises the plurality of indications; and
outputting the manifest to the user.

22. The method of claim 14, further comprising transmitting to the user status data about the availability of a reception device that is associated with the user.

23. The method of claim 14, further comprising transmitting to the user state data about the operational state of a reception device that is associated with the user.

24. A system comprising:
a memory; and
a processor, coupled to the memory, operative to:
receive:
i) a first indicium that indicates the availability of a recipient, and
ii) a transmission from a sender that is addressed to the recipient;
transmit:
i) a second indicium to the recipient, and
ii) a response to the sender of the transmission,
wherein the second indicium and the response are based on:
i) the first indicium, and
ii) information about the transmission.

25. The system of claim 24 wherein the processor is further operative to:
update the availability of the recipient; and
wherein the response is further based on the updated availability of the recipient.

26. The system of claim 24 wherein the processor is operative to transmit the second indicium to the recipient for a specified period of time.

27. The system of claim 24, wherein the processor is operative to transmit the second indicium to the recipient continuously.

28. A system comprising:
a memory;
a processor, coupled to the memory, the processor operative to:
transmit to a device an indication based on:
i) a notification signal that was received from a sender and was addressed to a user that is associated with the device, and
ii) data about the schedule of the user,
wherein the indication comprises:
i) an identification of a type of transmission that was addressed to the user, and
ii) a representation of a response to the transmission that was generated based on the schedule of the user.

29. A computer recordable medium encoded with instructions comprising:
receiving a notification signal corresponding to a transmission event;
transmitting indication data,
wherein the indication data is based on the notification signal,
wherein the indication data is based on at least one schedule data relating to a user,
wherein the indication data comprises an identification of a type of transmission event and a representation of a response to the transmission event, and
wherein the response was generated by the computer recordable medium based on the schedule data.

30. The computer recordable medium of claim 29, further comprising instructions for updating the schedule data.

31. The computer recordable medium of claim 29, further comprising:
instructions for generating user-defined feedback data; and
instructions for utilizing the user-defined feedback data in the transmitting step.

* * * * *